United States Patent
Mayer, III

(10) Patent No.: US 6,302,054 B1
(45) Date of Patent: Oct. 16, 2001

(54) FREEZING WEATHER INDICATOR AND METHOD

(76) Inventor: Robert A. Mayer, III, 1019 Latham Rd., Greensboro, NC (US) 27408

( * ) Notice: Subject to any disclaimer, the term of this patent is extended or adjusted under 35 U.S.C. 154(b) by 0 days.

(21) Appl. No.: 09/680,407

(22) Filed: Sep. 29, 2000

Related U.S. Application Data

(63) Continuation of application No. 09/074,798, filed on May 8, 1998, now abandoned.

(51) Int. Cl.[7] .................................................. G01K 1/02
(52) U.S. Cl. ...................... 116/216; 116/63 R; 116/281
(58) Field of Search .......................... 116/215, 216, 116/217, 218, 281, 283, 173, DIG. 7, 63 P, 63 R; 374/159, 201

(56) References Cited

U.S. PATENT DOCUMENTS

| | | | |
|---|---|---|---|
| 476,374 | * | 6/1892 | Eastman ................................ 116/216 |
| 1,176,010 | * | 3/1916 | Williams ............................... 116/216 |
| 1,453,769 | * | 5/1923 | Sandvoss ............................... 116/216 |
| 3,621,810 | * | 11/1971 | Zuck, Jr. ............................... 116/283 |
| 4,083,250 | * | 4/1978 | Goff et al. ............................ 374/201 |
| 4,089,222 | * | 5/1978 | Perkins .................................. 116/101 |
| 4,132,186 | * | 1/1979 | Manske et al. ....................... 116/216 |

FOREIGN PATENT DOCUMENTS

| | | | |
|---|---|---|---|
| 2634579 | * | 2/1978 | (DE) .................................... 116/216 |
| 2281704 | * | 3/1976 | (FR) ..................................... 374/201 |

* cited by examiner

*Primary Examiner*—Andrew H. Hirshfeld

(57) ABSTRACT

A device for indicating freezing weather conditions is easily installed beside a road or highway for signaling motorists. The device includes a fluid container having a spherical visual indicator attached thereto. As the temperature drops the contained liquid freezes, urging the spherical indicator from a hidden to an exposed posture. The motorists, seeing the brightly colored ball, realize that freezing conditions exists and will thereafter drive in a more precautionary manner for accident prevention.

13 Claims, 2 Drawing Sheets

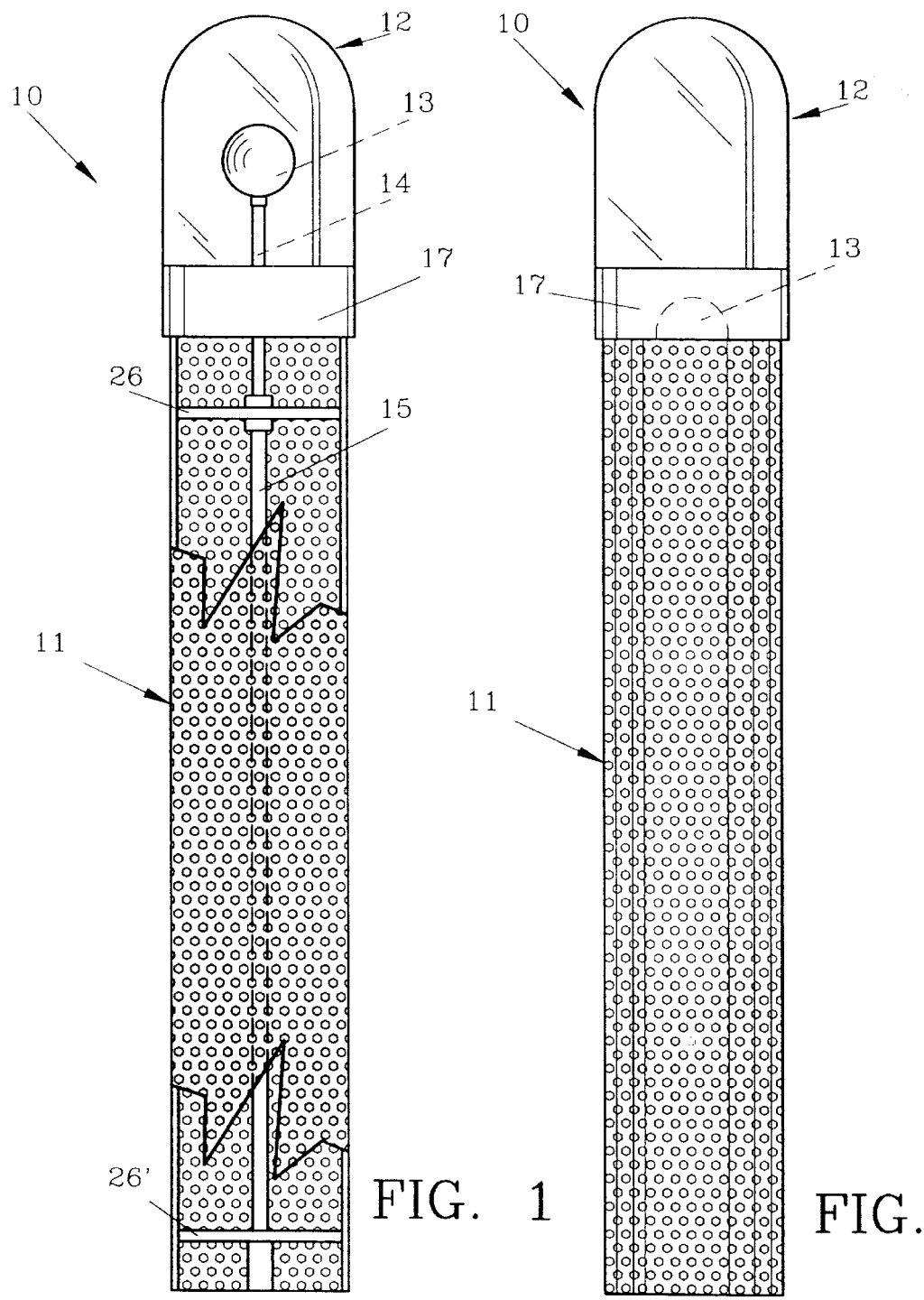

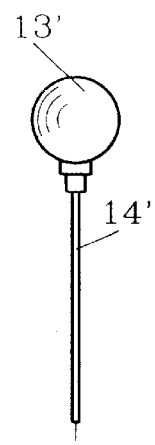
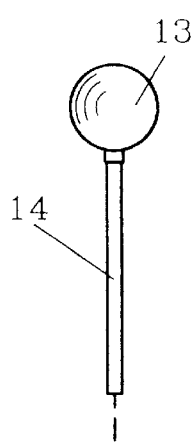
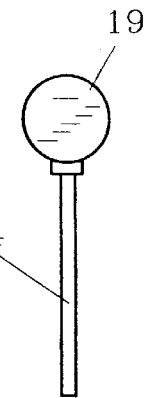
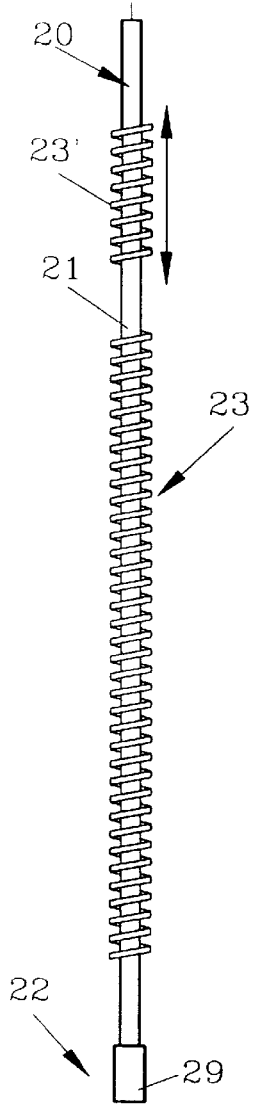
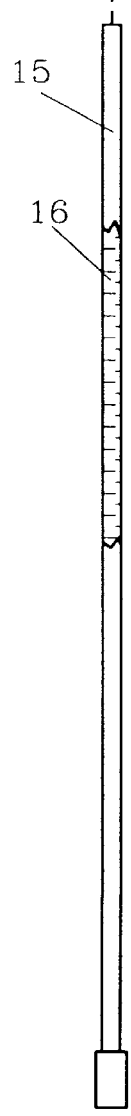
FIG. 4
FIG. 5
FIG. 3

FREEZING WEATHER INDICATOR AND METHOD

This is a continuation of application Ser. No. 09/074,798 filed May 8, 1998, now abandoned.

BACKGROUND OF THE INVENTION

1. Field of the Invention

The invention herein pertains to a device which visually signals freezing temperatures for motorists and others.

2. Description of the Prior Art and Objectives of the Invention

Vehicle accidents escalate in areas when temperatures suddenly drop below freezing on roads and highways. Water which remains on or reaches roadways can suddenly freeze and turn a harmless condition into a hazard for unsuspecting motorists, causing vehicles to slide or carom out of control. Drivers that frequently drive in icy conditions generally do so in a cautious, deliberate manner. However, unsuspecting drivers that suddenly encounter icy or freezing conditions may lose control of the vehicles, causing severe accidents and death. Pilots, joggers, skiers and others can also benefit from the knowledge of current temperature conditions.

Transportation departments and municipalities have used signs of various types in the past to warn of icing road conditions in an effort to alert motorists. However, such signs are not necessarily controlled by the weather conditions, i.e., such are controlled by workers observing the weather conditions. Thus, if a "ROAD ICING" sign is in place beside a road for an extended period after the icing conditions have temporarily ceased, drivers become desensitized to such signs and pay little or no attention to them. This creates a potential problem if the road freezes suddenly for an unsuspecting driver.

Thus with the foregoing problems and disadvantages of conventional warning devices, the present invention was conceived and one of its objectives is to provide a freezing weather indicator for motorists or others which is controlled by the actual weather conditions or temperature.

It is another objective of the present invention to provide a freezing weather indicator and method which can be readily placed in service along roads, highways, intersections and the like by relatively unskilled personnel.

It is still another objective of the present invention to provide a freezing weather indicator which is clearly visible by motorists and other passersby.

It is yet another objective of the present invention to provide a freezing weather indicator which can be constructed with relatively few moving parts and easily maintained.

It is another objective of the present invention to provide a compact, self-contained structure for providing a visual indication of freezing weather conditions.

It is a further objective of the present invention to provide a freezing weather indicator which utilizes a fluid container which includes a liquid which expands during freezing.

It is a further objective of the present invention to provide a freezing indicator and method whereby a brightly colored sphere is movable from a hidden to an exposed position for freezing temperature indication.

Various other objectives and advantages of the present invention will become apparent to those skilled in the art as a more detailed description of the invention is set forth below.

SUMMARY OF THE INVENTION

The aforesaid and other objectives are realized by providing an independent, self-standing structure which includes a fluid container which is open at the top and sealed at the bottom and a visual indicator such as a brightly colored sphere or other shape in communication therewith. A screen-like housing is provided around the fluid container and a transparent dome is affixed atop the housing for containing and protecting the colored sphere from adverse weather, vandalism and the like.

Water or other suitable expandable, freezable liquid is positioned in the vertical fluid container which may be tubular or otherwise shaped. The visual indicator is joined to a rod or similar means movably positioned within the liquid. Thus, as the liquid freezes and expands it urges the rod and sphere upwardly, from the tubular fluid container allowing the sphere to become exposed through the transparent dome. Motorists, joggers, pilots, skiers or others passing by the indicator easily see the colored sphere within the transparent shield and realize that freezing conditions now exist. As the weather condition changes and the temperature rises above freezing, the ice formed within the fluid container melts, allowing the spherical indicator to drop and disappear from sight below an opaque band along the bottom of the transparent dome.

BRIEF DESCRIPTION OF THE DRAWINGS

FIG. 1 shows a side elevational view of the preferred embodiment of the freezing weather indicator in cut away fashion with the spherical indicator in a raised, exposed posture;

FIG. 2 illustrates the freezing weather indicator of FIG. 1 but with the spherical indicator hidden from view;

FIG. 3 features an exploded view of the fluid container and visual indicator removed from the housing;

FIG. 4 demonstrates an alternate embodiment of the visual indicator of FIG. 1; and FIG. 5 depicts an alternate embodiment of a fluid container with fins.

DETAILED DESCRIPTION OF THE PREFERRED EMBODIMENTS AND OPERATION OF THE INVENTION

For a better understanding of the invention and its operation, turning now to the drawings, FIG. 1 shows a preferred embodiment of freezing weather indicator 10 which has a height of approximately fifty-five inches (139.70 cm) and which is substantially cylindrically shaped with an outside diameter of approximately eight inches (20.32 cm). Housing 11 shown cut away, surrounds fluid container 15 and consists of a conventional stamped metal screen having openings of approximately one-eighth inch (0.3175 cm). Lateral supports 26, 26' maintain fluid container 15 in an upright, vertical position, while spacing fluid container 15 from housing 11. Transparent dome 12 is shaped and molded, for example preferably from a rigid transparent plastic such as a polycarbonate or the like. Dome 12 may be any shape but cylindrical, egg-like or spherical are preferred. Spherical visual indicator 13 is formed from a lightweight plastic such as a bright red or orange polyethylene and is affixed to rod 14 (FIG. 3). Rod 14 is likewise molded from a lightweight, low density plastic such as polyethylene and is slidably positionable in the top of tubular fluid container 15 which preferably consists of a cylindrical copper tube (although other suitable materials may be used), closed at the bottom and having a wall thickness sufficient to prevent rupturing upon liquid freezing and an outside diameter of three-quarters of an inch (1.905 cm). Rod 14 may be solid and for example, five-eights inches (1.5875 cm) in diameter. Spherical visual indicator 13 has a preferred diameter of three and one-half inches (8.89 cm), although other sizes, shapes and colors may be used. Water 16 (FIG. 3) is the preferred liquid used within fluid container 15 although other liquids having different freezing temperatures may be selected as desired.

FIG. 5 illustrates an alternative fluid container 20 which consists of a copper tube 21 sealed along the bottom 22 by cap 29 for receiving rod 14'. Fluid container 20 includes a spiral shaped fin 23 therealong which may be rigidly attached or can be releasably affixed (see movable fin 23') for adjustability along copper tube 21. Fin 23 provides greater heat transfer surface area for copper tube 21 and is more responsive (responds in less time) to temperature changes than preferred fluid container 15 shown in FIGS. 1 and 3. Fins 23, 23' may be formed of aluminum or other metals having good heat conduction properties.

As visual indicator 10 is installed beside a road, highway, intersection or the like screen housing 11 protects fluid container 15 from debris and abuse while allowing air flow freely therethrough for quick response to temperature changes. Stakes, lag bolts, or other standard mounting devices can be used to affix visual indicator 10 to a selected site as desired.

When temperatures reach freezing, water 16 contained within fluid container 15 begins to freeze and the ice formation within fluid container 15 urges rod 14 and spherical visual indicator 13 upwardly. Opaque band 17 as seen in FIGS. 1 and 2 surrounds transparent shield 12 and may be for example, three inches (7.62 cm) in width and is positioned to obscure the view of spherical indicator 13 during usual temperature conditions above freezing (0° C.). However, as temperatures drop and water 16 within fluid container 15 begins to freeze, rod 14 which acts as a means that is movable within fluid container 15 rises from the position seen in FIG. 2 to expose spherical indicator 13 above opaque band 17.

While the preferred visual indicator consists of a brightly colored sphere 13, other shapes may be employed. In FIG. 4, disc 19 is shown which likewise may be brightly colored.

The preferred method of utilizing the invention includes placing rod 14 attached to movable visual indicator 13 in fluid container 15 having water 16 therein, allowing water 16 to freeze thereby raising visual indicator 13 from a hidden posture (FIG. 2) into an exposed viewable posture above opaque band 17 as shown in FIG. 1 for motorists or others such as pedestrians to determine that freezing temperature conditions exist.

While not shown a seal or collar may be affixed to the upper end of fluid container 15 between rod 14 and the interior wall of fluid container 15 to prevent evaporation of water 16 therefrom.

Changes and modifications can be made to the structure, size and materials described herein for particular applications by those skilled in the art However, the examples and illustrations shown and described are merely for explanatory purposes and are not intended to limit the scope of the appended claims.

I claim:

1. A device for indicating freezing weather conditions comprising:

a. a tubular fluid container, a perforated housing, said housing surrounding said tubular fluid container and being spaced therefrom;

b. a freezable liquid, said freezable liquid contained within said fluid container;

c. a movable structure mounted within said fluid container;

d. a visual indicator, said visual indicator attached to said movable structure; and e. a transparent dome, said dome secured to a top of said perforated housing, said transparent dome surrounding said visual indicator for viewing said visual indicator in an indicating position, whereby said liquid upon freezing urges said visual indicator upwardly to said indicating position.

2. The device of claim 1 wherein said freezable liquid comprises water.

3. The device of claim 2 wherein said fluid container comprises a rigid metal tube.

4. The device of claim 3 wherein said visual indicator comprises a sphere.

5. The device of claim 4 wherein said perforated housing comprises a screen.

6. The device of claim 5 wherein said movable structure comprises a rod, said rod slidably positioned within said fluid container, said visual indicator attached to said rod.

7. A freezing weather indicator comprising: a fluid container and being spaced therefrom, a perforated housing, said housing enclosing said fluid container, an opaque band, said opaque band mounted atop said housing, a transparent dome, said transparent dome secured to a top of said housing and extending above said opaque band, a freezable liquid, said freezable liquid within said container, a movable structure mounted within said container contiguous to said liquid, a visual indicator, said visual indicator attached to said movable structure whereby said liquid upon freezing urges said visual indicator upwardly past said opaque band and into said dome for viewing.

8. The freezing weather indicator of claim 7 wherein said fluid container comprises a metal tube.

9. The freezing weather indicator of claim 7 wherein said movable structure comprises a rod.

10. A method of indicating freezing weather conditions utilizing a freezable liquid within a fluid container said container being surrounded by a perforated housing spaced from said container, wherein a transparent dome is secured to a top of said housing, said method comprising the steps of:

a. placing a movable structure in the freezable liquid contained within said fluid container surrounded by the housing;

b. allowing the liquid to freeze; and c. allowing the structure to rise such that an indicator attached to said structure is moved into a viewable position inside the transparent dome as said liquid freezes and expands.

11. The method of claim 10 wherein said indicator is a sphere.

12. The method of claim 10 wherein said liquid is water.

13. The method of claim 10 further comprising the step of installing the housing beside a road.

* * * * *